(No Model.)
T. D. LINES.
SPRING COUPLING.
No. 322,734. Patented July 21, 1885.
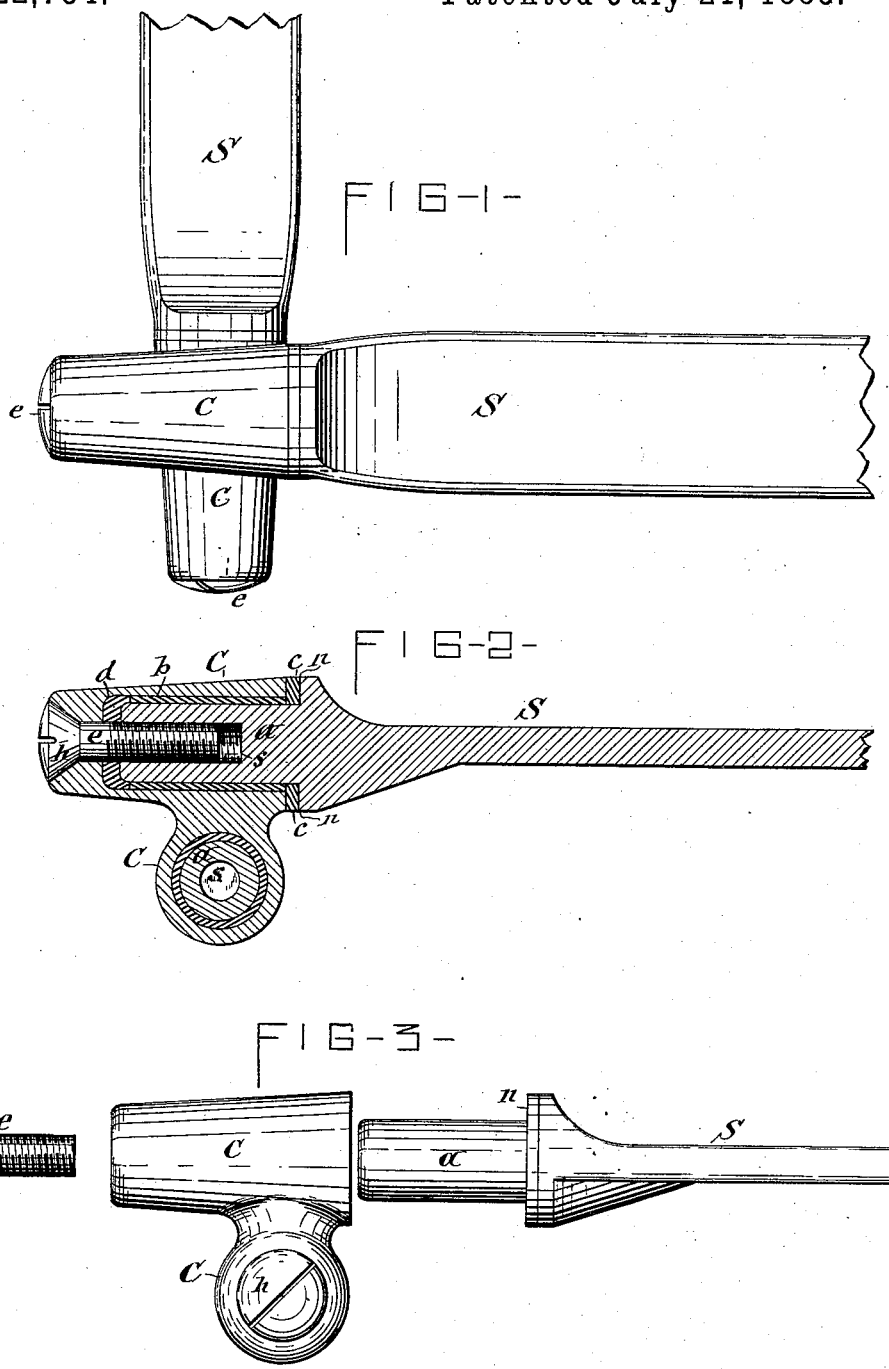

UNITED STATES PATENT OFFICE.

THOMAS D. LINES, OF SYRACUSE, NEW YORK.

SPRING-COUPLING.

SPECIFICATION forming part of Letters Patent No. 322,734, dated July 21, 1885.

Application filed March 23, 1885. (No model.)

*To all whom it may concern:*

Be it known that I, THOMAS D. LINES, of Syracuse, in the county of Onondaga, in the State of New York, have invented new and useful Improvements in Spring-Couplings, of which the following, taken in connection with the accompanying drawings, is a full, clear, and exact description.

This invention relates to the couplings of cross-springs with side springs of vehicles, and has more particular reference to the class of couplings in which studs on the ends of the respective springs enter sleeves or thimbles which stand at right angles to each other and are integrally or firmly attached to each other.

In this class of couplings considerable difficulty has been experienced to prevent the rattling incident to the wear of the same, and it is to accomplish this desired object for which my present invention is designed; and to that end my invention consists in the improved construction and combination of parts, as hereinafter fully described, and specifically set forth in the claims.

In the accompanying drawings, Figure 1 is a plan view of my improved spring-coupling. Fig. 2 is a vertical transverse section of the same, and Fig. 3 is a side view of the parts detached from each other.

Similar letters of reference indicate corresponding parts.

S S represent the end portions of a side spring and end spring of a vehicle. Each of said springs I provide with a gudgeon or stud, $a$, which projects from the end of the spring.

C C denote the two thimbles or sleeves, which stand at right angles to each other and in different horizontal planes, and are cast in one piece of metal. Into these thimbles project the studs $a\ a$ of the two springs, and are retained therein by means of coupling-bolts $e\ e$, which are inserted through the ends of the thimbles and engage with screw-threaded sockets $s\ s$ in the inner ends of the studs $a\ a$. The head $h$ of the coupling-bolt is countersunk in the end of the thimble to prevent undue projection thereat, and produce a neat workmanlike finish of the coupling, as shown in Figs. 1 and 2 of the drawings. Around the sides of the stud $a$ I wrap an anti rattling bush, $b$, of leather or other suitable analogous material, and between the usual shoulder, $n$, on the spring and the adjacent end of the thimble I interpose a packing-ring, $c$, also preferably of leather, and another similar packing, $d$, I interpose between the inner end of the stud $a$ and inner end of the thimble, as shown in Fig. 2 of the drawings. By turning the coupling-bolt $e$ so as to draw the stud $a$ into the thimble, the coupling becomes tightened, so as to effectually prevent the rattling thereof.

Having described my invention, what I claim as new, and desire to secure by Letters Patent, is—

1. In a spring-coupling, the combination of a thimble, a stud projecting from the end of the spring and into the cavity of the thimble, a screw-threaded socket in the inner end of the stud, and a coupling-bolt inserted through the end of the thimble and engaging the socket of the stud, substantially as set forth.

2. The improved spring-coupling, comprising the thimble C, the stud $a$, projecting from the end of the spring and into the thimble, and provided with the screw-threaded socket $s$, the bush $b$, end packings, $c\ d$, and the coupling-bolt $e$, inserted through the end of the thimble and engaging the screw-threaded socket of the stud $a$, substantially as described and shown.

In testimony whereof I have hereunto signed my name and affixed my seal, in the presence of two attesting witnesses, at Syracuse, in the county of Onondaga, in the State of New York, this 20th day of March, 1885.

THOMAS D. LINES. [L. S.]

Witnesses:
FREDERICK H. GIBBS,
C. BENDIXON.